(12) United States Patent  
Salters et al.

(10) Patent No.: US 8,113,703 B2
(45) Date of Patent: Feb. 14, 2012

(54) DUAL-LAYER LIGHT GUIDE STRUCTURE FOR LED-BASED LIGHTING DEVICE

(75) Inventors: Bart Andre Salters, Eindhoven (NL); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 291 days.

(21) Appl. No.: 12/307,394

(22) PCT Filed: Jul. 3, 2007

(86) PCT No.: PCT/IB2007/052570
§ 371 (c)(1),
(2), (4) Date: Jan. 5, 2009

(87) PCT Pub. No.: WO2008/007294
PCT Pub. Date: Jan. 17, 2008

(65) Prior Publication Data
US 2009/0290376 A1    Nov. 26, 2009

(30) Foreign Application Priority Data

Jul. 7, 2006  (EP) .................................... 06116789

(51) Int. Cl.
*F21V 7/04*    (2006.01)
(52) U.S. Cl. ........ 362/612; 362/231; 362/615; 362/257; 362/235

(58) Field of Classification Search .................. 362/612, 362/231, 615, 800, 555, 230, 611, 613, 227, 362/234, 253, 257, 235; 385/146
See application file for complete search history.

(56) References Cited

U.S. PATENT DOCUMENTS

| 6,443,597 | B1 | 9/2002 | Natori | |
| 7,387,421 | B2 * | 6/2008 | Lee et al. | 362/612 |
| 7,641,360 | B2 * | 1/2010 | Chou et al. | 362/235 |
| 7,744,225 | B2 * | 6/2010 | Suzuki | 353/94 |
| 2004/0070966 | A1 | 4/2004 | Ahn et al. | |
| 2005/0007753 | A1 | 1/2005 | Van Hees et al. | |
| 2005/0141244 | A1 | 6/2005 | Hamada et al. | |
| 2006/0002146 | A1 * | 1/2006 | Baba | 362/613 |

FOREIGN PATENT DOCUMENTS

| EP | 1003064 A1 | 5/2000 |
| GB | 2393845 A | 4/2004 |
| JP | 09146089 A | 6/1997 |
| WO | 2004008023 A1 | 1/2004 |

* cited by examiner

*Primary Examiner* — Bao Q Truong
(74) *Attorney, Agent, or Firm* — Mark L. Beloborodov

(57) ABSTRACT

A device for guiding and mixing light comprising of a light guide, at least a first set of light emitting elements in a first layer and at least a second set of light emitting elements in a second layer. Each of the light emitting elements being arranged to emit light of at least a first predetermined frequency. The second layer extending in a second geometrical plane different from a first geometrical plane of the first layer for producing a uniform light output from the aggregate of the constituting frequencies.

7 Claims, 3 Drawing Sheets

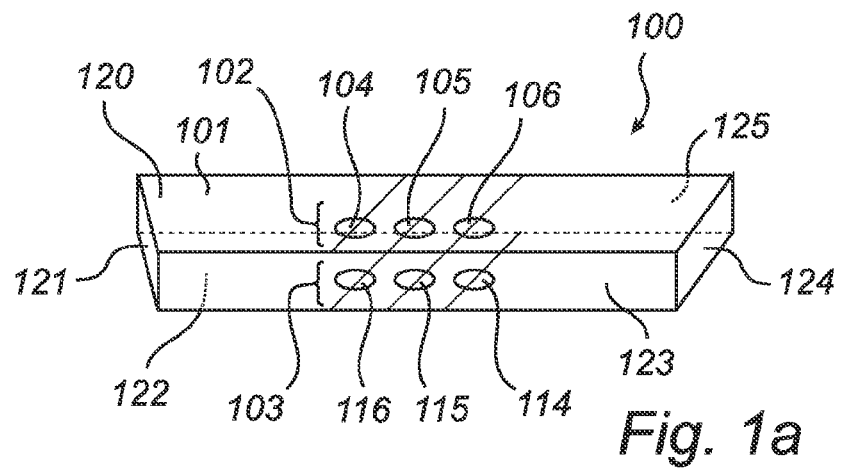
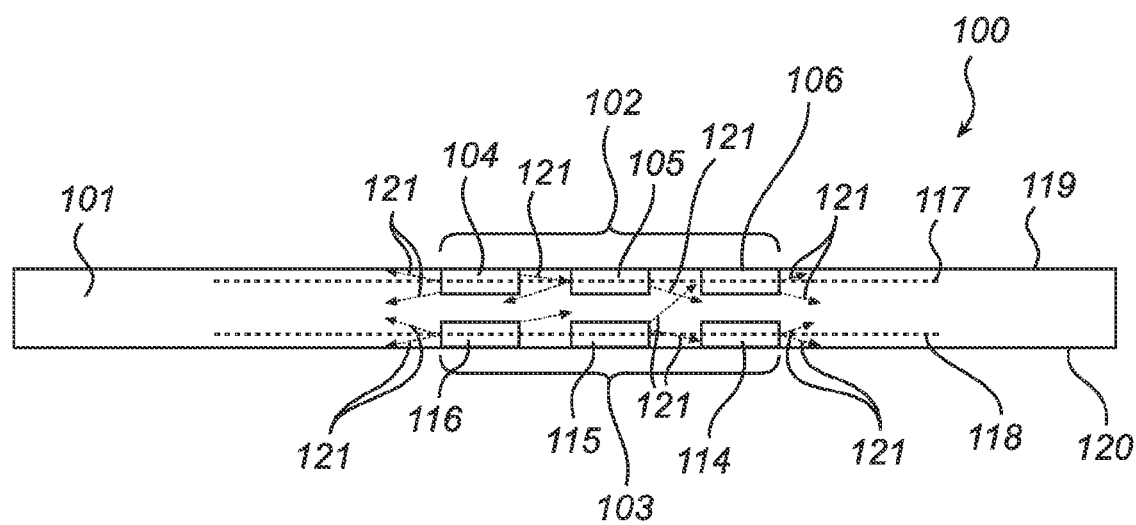

DUAL-LAYER LIGHT GUIDE STRUCTURE FOR LED-BASED LIGHTING DEVICE

This application is a national stage application under 35 U.S.C. §371 of International Application No. PCT/IB2007/052570 filed on Jul. 3, 2007, and published in the English language on Jan. 17, 2008, as International Publication No. WO/2008/007294, which claims priority to European Application No. 06116789.6, filed on Jul. 7, 2006, incorporated herein by reference.

TECHNICAL FIELD

The present invention relates to a light guide structure for mixing colors, especially for ambient light applications using light emitting diodes.

BACKGROUND OF INVENTION

For several new LED based lighting systems, light guides are used. Such a light guide, typically a flat or curved piece of transparent plastic or glass, usually serves two purposes. It guides light from a light source, e.g. one or more light emitting diodes (LEDs), to a desired spot, and helps it mixing the colors from individual red, green and blue LEDs. It is especially important with the mixing of colors, as non-perfect mixing results in colored edges and shadows, while white surfaces will not be white, but colored.

It is especially important with the mixing of colors, as non-perfect mixing results in colored edges and shadows, while white surfaces will not be white, but colored.

Light guides are used in many lighting applications, such as for general-purpose lighting or as a backlight for an LCD monitor or television. One such example is disclosed in International Patent Application WO 2004/008023 A1 in which a light guide device comprising an LED group as a light source, a light guide plate for color mixing and a light guide plate having a light output face is shown. The light guide device is provided as backlight source behind a liquid crystal display panel. It further shows a triangular prism for guiding light rays from the LED group to one end face of the light guide plate and triangular prisms for guiding light rays from the other end face of the light guide plate to one end face of the light guide plate.

Another possible application for these light guides is for instance in LED based ambient background lighting for television sets, such as a flat screen display panel. Light effects are generated around the TV that matches the image contents. The effect gives the impression of a larger virtual screen and a more immersive viewing experience. In addition, it reduces the strain on the eyes of the viewers.

In order to achieve this ambient background lighting effect it is known to have a lamp positioned behind a television set, which lamp emits light towards the wall. For these purposes it is common to use Cold Cathode Fluorescent (CCFL) lamps. For several reasons, a LED based version would be preferred. There are however known issues with color mixing and color uniformity associated with the use of LEDs. For instance, in order to be able to generate all colors, at least three different LEDs are required, i.e. one red, one green and one blue LED. The three LEDs are inherently positioned next to each other, and because of the different positions, the individual colors will not perfectly overlap each other in the output.

Using more LEDs per primary color is an alternative, yet this substantially increases the cost of a solution. Hence it would be preferably to have only a few, or even only one LED per color.

SUMMARY OF INVENTION

In view of the above, an object of the invention is to solve or at least reduce the problems discussed above. In particular, an object is to provide an improved light guide for producing improved color composition.

Another object of the present invention is to improve the performance of a light guide both in the mixing of colors and with a gradual change in intensity.

The above objects, are obtained according to a first aspect of the present invention by a device for guiding and mixing light comprising of a light guide, at least a first light emitting element in a first layer and at least a second light emitting element in a second layer. Each of the light emitting elements are arranged to emit light of at least a first predetermined frequency. The device is characterized in that the second layer extends in a second geometrical plane different from a first geometrical plane of the first layer for producing a uniform light output from the aggregate of the constituting frequencies. Hence, both the functionality to spread the light from a single point source and the functionality of mixing colors characterized by a light guide is hereby advantageously utilized. As an advantage, the light emitting elements are divided into different planes such that light emitted from the individual elements is much less obscured or shadowed by other light emitting elements. Also advantageously, a uniform light intensity output from the aggregate of the constituting frequencies is achieved. As another advantage, an improved performance is achieved with respect to color uniformity. According to one embodiment according to the invention, the light emitting elements are arranged to emit light of a narrow band of predetermined frequencies, such as to represent one distinct, primary perceived color.

According to one embodiment of the present invention, the geometrical planes of the first and second layers are essentially parallel with each other.

According to a further embodiment of the present invention, the at least first and second light emitting elements each comprise of a set of at least a first and a second light-emitting element. Hence, additional light emitting elements may be comprised such as to create a first and a second set of light emitting elements. Hence, a greater number of simultaneously emitted frequencies or colors is enabled, having as an advantage further improved color mixing.

According to another embodiment of the present invention, the sets comprise corresponding counterpart light emitting elements with respect to emittable frequency, the second set of light emitting elements being reversed in order with respect to the emittable frequencies as compared to the first set of light emitting elements.

The light emitting elements may be positioned outside the light guide having the emitted light led via light guiding means to the inside of the light guide. However, according to one embodiment of the present invention, the light emitting elements are comprised in a plane within the light guide. According to still a further embodiment of the present invention, the geometrical planes of the first and second layers of light emitting elements extend through the light guide. For instance, side emitting LEDs with an emissive pattern defining a plane, which plane coincides with the plane of the wave-guide.

According to another embodiment of the present invention, any of the sets comprise three light emitting elements arranged to emit individual colors allowing for frequencies corresponding to perceived white light to be produced. It is for instance possible to have a set of three light emitting elements in one plane, and a single light emitting element in another plane. As an advantage, the entire scale of colors can be reproduced by individually controlling the light intensity from each of three light emitting elements arranged to emit light of distinctly different colors, such as green, blue and red, hence an RGB-triplet. As a further advantage, the intensity of light of three primary colors, e.g. three different LEDs, is uniformly distributed on a screen or a surface. In other words, as an advantage, the invention helps to provide identical amounts of red, green and blue on each position on the wall, hence, resulting in a white wall. Thus uniformly colored images, as well as images with little or no color fringes are obtained.

In general, total brightness may vary over the illuminated area. As long as there are no differences in brightness between the individual colors at each specific spot, the sum will be white. According to a specific embodiment, for instance in the application of ambient backlighting, the absolute intensity of the color is not necessarily constant all over the screen of projection; it drops off with distance to the screen, something that is perfectly acceptable however.

According to one embodiment of the present invention, the colors are red, green and blue.

According to another embodiment of the present invention, a first set of the sets comprises a first, a second and a third light element along a first lateral direction, and a second set of the sets comprises corresponding counterpart elements positioned along a second lateral direction, and wherein the first and third counterpart elements are positioned diametrically opposite of each other, and the second counterpart elements are positioned opposite of each other.

According to another embodiment of the present invention, the light emitting elements are positioned essentially in a row. It should also be noted that the LEDs need not be perfectly positioned in a row. They can for instance be positioned slightly off from a lateral point of view, such as to form a slightly triangular shape.

According to yet another embodiment of the present invention, the light emitting elements comprises light emitting diodes.

According to still yet another embodiment of the present invention, the light emitting elements are equally separated from each other.

In other words, what is presented according to the invention is a new light guide structure, preferably for LED light sources in the field of ambient lighting technology. Light sources are positioned between a top and a bottom plane of a light guide.

BRIEF DESCRIPTION OF DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1 shows a) a three dimensional view and b) a side view of a light guide according to the invention;

DETAILED DESCRIPTION OF THE PRESENT INVENTION

In order to achieve a more uniform distribution of light comprised of several colors, it is a technique to use light guides which, while transporting the light through Total Internal Reflection (TIR), also mix light of different colors passing through the light guide at the same time. For instance, with total internal reflection (TIR) light can be held inside the light guide. Only when light encounters a surface with an angle sufficiently close to the normal, light may exit the light guide.

Figure 3:
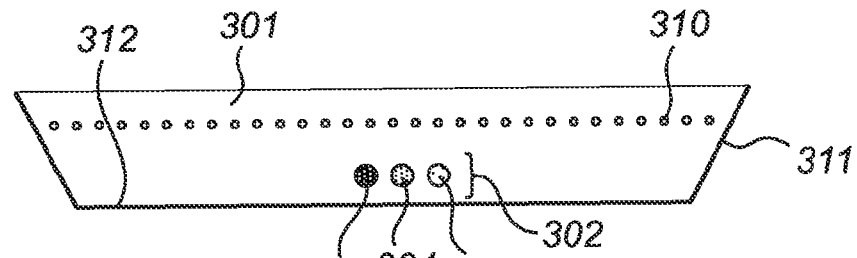
FIG. 3 shows a light guide having one arrangement of LEDs.
Figure 4:
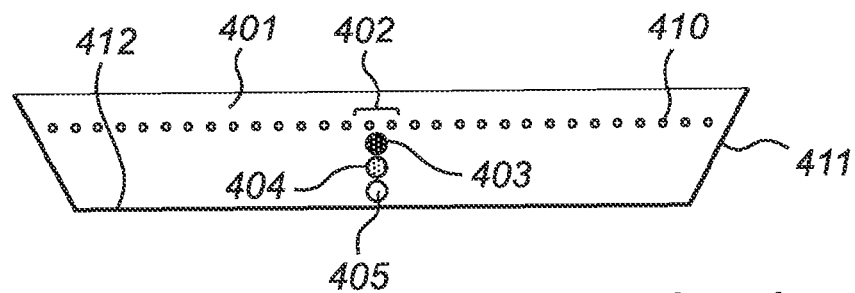
FIG. 4 shows a light guide having another arrangement of LEDs.

FIGS. 3 and 4 shows examples of arrangements of LEDs 302 and 402 within a light guide 301 and 401. For instance, FIG. 3 shows how three different colored side-emitting LEDs 303, 304 and 305 are arranged side by side in a row parallel to a plane of projection (not shown). The side-emitting LEDs comprise a 'naked' LED die and some additional optics to emit light sidewards, into the plane of the light guide. Furthermore, the thickened line shown on three of the four walls in this two dimensional view of a light guide represent mirrored coatings 312 and 412. Due to the different positions of the LEDs, the light from the three LEDs do not add up to produce a uniform distribution of white light on the object to be illuminated. Instead, in some areas red will be dominant, while in other areas green or blue will be more visible, as the red LED blocks or shadows and therefore prevents light from other LEDs to reach certain areas. Hence, due to blocking of each other, the resulting light distribution from the individual light elements becomes spatially separated.

Another alternative is shown in FIG. 4, illustrating a light guide 401 in which LEDs 403, 404, and 405 have been positioned side by side in a row perpendicular to a plane of projection (not shown). Here, the left-right asymmetry has been solved, although the green and blue light is blocked from exiting straight out. Now the problem is that mainly red light will be visible in the center. Hence, blocking of one or more of the LEDs can not be avoided by positioning LEDs in a two-dimensional plane unless several LEDs of each color are used, which would severely affect the cost. Even with multiple LEDs, shadowed regions will remain. In fact, more shadows will arise, although, with 2 red LEDs, maybe not more than one at a time will be blocked. The overall effect will be that light of a specific color is only partially blocked in any given region.

Also in FIGS. 3 and 4, small light scattering structures 310 and 410 shown as tiny circles contribute to reflect the light out of the light guide. Without these, most light would remain inside the light guide until reflected out by the 45-degree sides 311 and 411 of the light guide. At the same time, the scattering structures 310 and 410 represent a technique of spreading light and achieving an improved uniformity in intensity. Hence, although these and other techniques provide some improvements to spreading and mixing of light, it is required to find better and more efficient techniques for these purposes.

Figure 5:
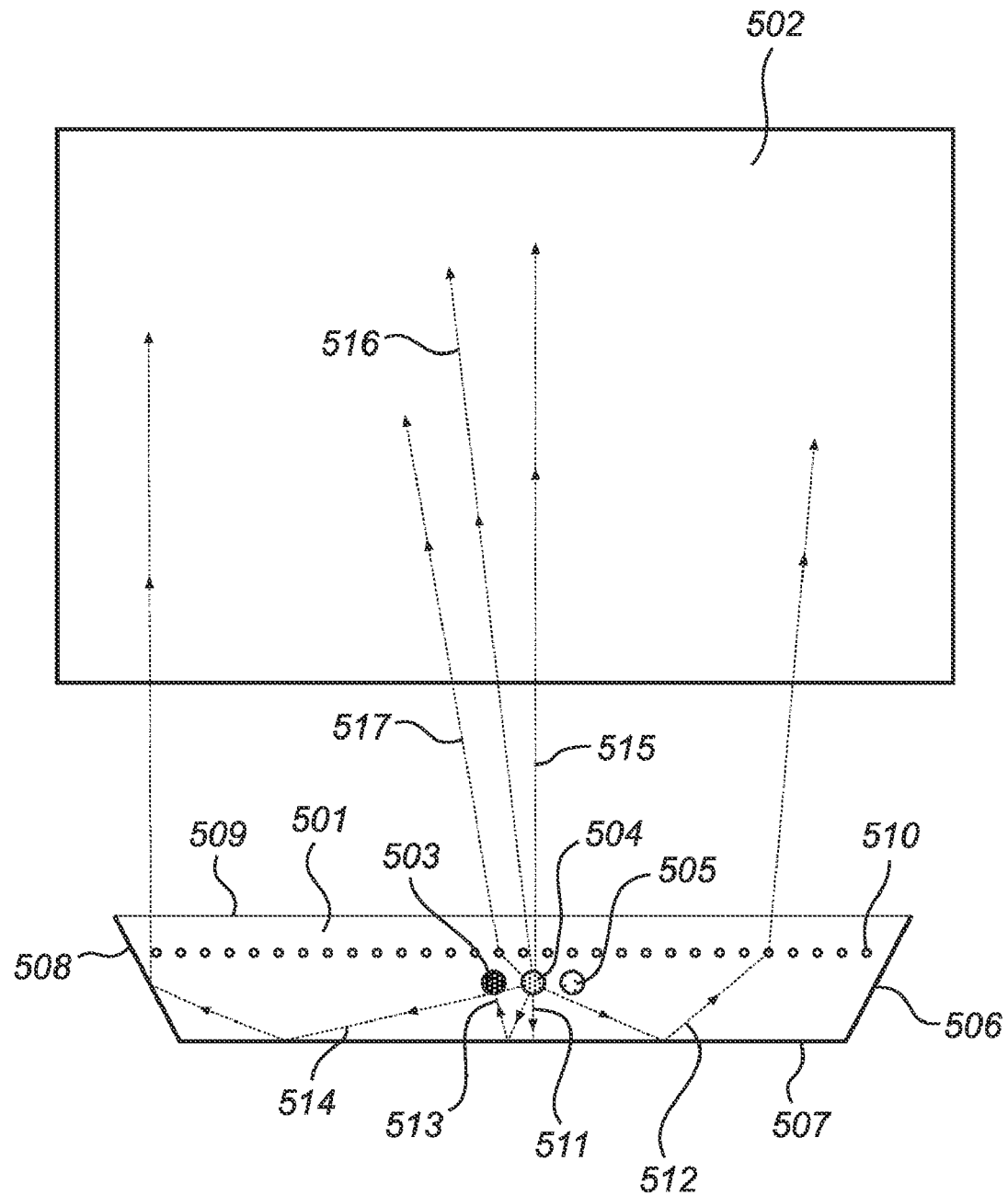
FIG. 5 shows a light guide and a wall onto which light emitted by light guide is projected.

FIG. 5 shows a light guide 501 and a wall or plane of projection 502 for projecting light output from the light guide onto. The light guide 501 has three light emitting elements 503, 504 and 505 positioned in a row. The light guide 501 comprises three reflecting walls 506, 507 and 508, and one output side 509 near which scattering structures 510 are positioned. Light rays indicated by arrows 511, 512, 513, 514 and 515 represent various paths of propagation of light emitted from one 504 of the light emitting elements. Light ray 511 is reflected at the back wall 507 of the light guide and is blocked in the light-emitting element 504. Light ray 512 is reflected at the back wall 507 and scattered in a scattering structure 510 before reaching the wall 502. Light ray 513 is reflected at the back wall 507 and is blocked by light emitting element 503. Light ray 514 is reflected at the back wall 507 and at the sidewall 508 before exiting through the output side 509 and reaching the wall 502. Light ray 517 is scattered in a scattering structure 510 before reaching the wall 502. Light rays 515 and 516 exits directly through the output side 509 and reaches the wall 502.

FIG. 1 shows a three-dimensional view of a device 100 for diffusing light according to the invention. The device 100 comprises a light guide 101, a first 102 and a second 103 set of light emitting elements embedded in the light guide. The first and second sets of light emitting elements are shown with a first 104 and 114, a second 105 and 115, and a third 106 and 116 corresponding pair of counterpart elements. Hence, FIG. 1 shows a light guide with a dual layer of light emitting elements, e.g. LEDs. The illustration is only a demonstration of one preferred embodiment and other alternative embodiments exist, for instance one in which a greater number of light emitting elements is used. However, going back to the specific example as illustrated, the individual pairs of light emitting elements may emit light in various colors. For instance, the pair of light emitting elements 104 and 114 may emit blue light, 105 and 115 green light, and 106 and 116 red light.

By having a first pair of light emitting elements opposing each other in the middle as with 105 and 115, and the two remaining pairs diametrically opposing each other, symmetry in the light output is achieved. The paths of travel for light emanating from any of the individual elements are undisturbed and the resulting aggregated composition of colors is enhanced in uniformity. Hence, a white picture comprising equal amounts of red, green and blue light in all positions on the screen is also achieved as all three colors have the same uniform distribution.

Section b) of FIG. 1 shows a side view of a device as depicted in section a) of FIG. 1. The light emitting elements 104, 105, 106, 114, 115, and 116 are positioned in two layers represented by two parallel geometrical planes 117 and 118, extending through the light guide 101. The layers are positioned inside the light guide 101 between a top 119 and bottom 120 part of the light guide 101. Arrows 121 indicate light rays emitted from the light emitting elements 104, 105, 106, 114, 115, and 116.

Figure 2:
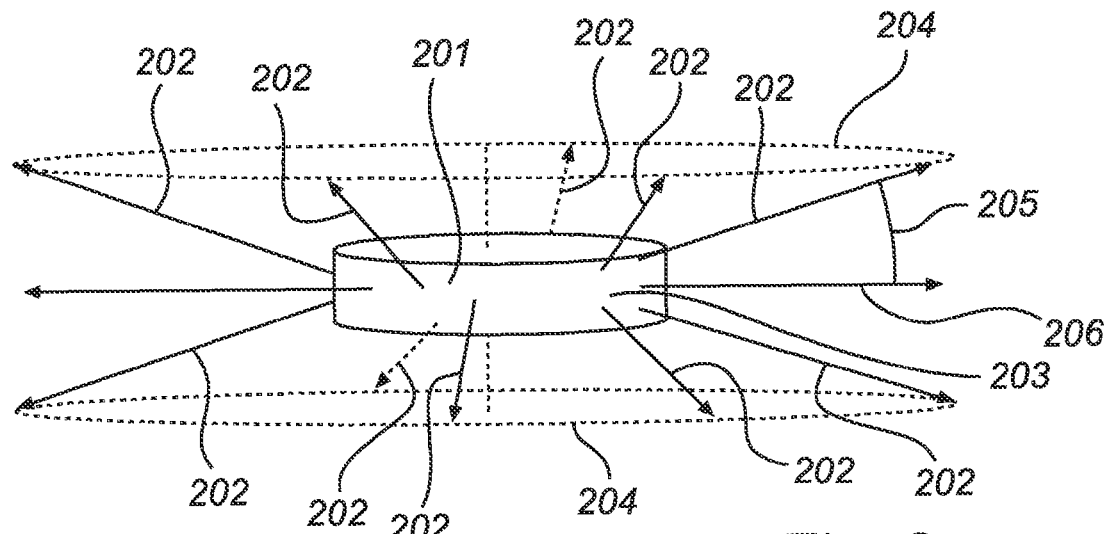
FIG. 2 shows a side emitting light element according to one embodiment of the invention.

FIG. 2 shows a side emitting light element 201 for placement in a light guide (not shown) according to the invention. Light indicated by arrows 202 is emitted sideways, away from the cylindrical periphery 203, and defines a symmetrical cone 204 of light. The cone extends at an angle 205 from both sides of a normal 206 of a geometrical plane in the elongation of the light guide as indicated by 117 and 118 in FIG. 1. According to a specific type of side emitting elements, or LEDs, the angle is approximately 20 degrees. Hence, the pattern of emitted light basically resembles that from a lighthouse, although in all directions simultaneously. Hence, even with this configuration, as seen from FIG. 1 in combination with FIG. 2, some LEDs will block some of the light from neighboring LEDs, although significantly less than before, as the light may pass below or above the other LEDs.

It should be noted that the figures are not to scale, and that in reality the width will usually be much larger than the height. For specific applications, the specific requirements may preferably be a ratio of roughly 25 to 1.

The invention claimed is:

1. A device for guiding and mixing light, the device comprising:
   a light guide,
   at least a first set of light emitting elements arranged in a first layer extending in a first geometrical plane; and
   at least a second set of light emitting elements arranged in a second layer extending in a second geometrical plane different from and substantially parallel to the first geometrical plane, each of said light emitting elements arranged to emit light of at least a first predetermined frequency, wherein the first and second sets comprise corresponding counterpart light emitting elements with respect to frequencies of light emitted thereby, the second set of light emitting elements being arranged in reversed order of the frequencies relative to the first set of light emitting elements, wherein the light emitting elements are disposed within said light guide, and wherein the first set comprises a first, a second and a third light element positioned along a first lateral direction, and the second set comprises corresponding counterpart elements positioned along a second lateral direction, and wherein the first and third counterpart elements are positioned diametrically opposite of each other, and the second counterpart elements are positioned opposite of each other.

2. The device according to claim 1, wherein the geometrical planes of the first and second layers extend through the light guide.

3. The device according to claim 1, wherein at least one of the first and second sets comprise at least three light emitting elements arranged to emit light of different colors.

4. The device according to claim 3, wherein the colors are red, green and blue.

5. The device according to claim 1 wherein the light emitting elements are positioned essentially in a row.

6. The device according to claim 1, wherein the light emitting elements are light emitting diodes.

7. The device according to claim 1, wherein the light emitting elements are disposed at the same distance from each other.

* * * * *